United States Patent
Chen (10) Patent No.: US 7,308,207 B2
(45) Date of Patent: Dec. 11, 2007

(54) METHOD FOR IDENTIFYING AN INTERROGATED OBJECT USING A DYNAMIC OPTICAL TAG IDENTIFICATION SYSTEM

(75) Inventor: Chungte W. Chen, Irvine, CA (US)

(73) Assignee: Raytheon Company, Waltham, MA (US)

( * ) Notice: Subject to any disclaimer, the term of this patent is extended or adjusted under 35 U.S.C. 154(b) by 612 days.

(21) Appl. No.: 10/715,261

(22) Filed: Nov. 17, 2003

(65) Prior Publication Data

US 2005/0105914 A1  May 19, 2005

(51) Int. Cl.
*H04B 10/00* (2006.01)
(52) U.S. Cl. .................. 398/170; 398/169; 398/118; 398/135; 398/128; 398/130; 359/291; 342/45; 455/106; 455/603; 455/604; 455/605
(58) Field of Classification Search ............... 359/291; 398/169, 170, 135, 118, 128, 130; 342/45; 455/106, 603, 604, 605
See application file for complete search history.

(56) References Cited

U.S. PATENT DOCUMENTS

| | | | |
|---|---|---|---|
| 4,361,911 A | 11/1982 | Buser et al. | |
| 4,517,569 A | 5/1985 | Gerharz | |
| 5,274,379 A | 12/1993 | Carbonneau et al. | |
| 5,822,119 A | 10/1998 | Rasmussen et al. | |
| 6,137,623 A | 10/2000 | Roberson et al. | |
| 6,233,088 B1* | 5/2001 | Roberson et al. | 359/291 |
| 6,353,489 B1* | 3/2002 | Popovich et al. | 359/15 |
| 6,359,719 B1 | 3/2002 | Ori | |
| 6,493,123 B1* | 12/2002 | Mansell et al. | 398/169 |
| 2003/0193717 A1 | 10/2003 | Gubel, Sr. | |

FOREIGN PATENT DOCUMENTS

WO    WO 01/38906 A2    5/2001

OTHER PUBLICATIONS

Kahn, J.M., et al.: 'Next Century Challenges: Mobile Networking for "Smart Dust"' 5th Annual ACM/IEEE Int'l. Conference on Mobile Computing and Networking, Seattle, WA and New York, NY, Aug. 1999, vol. Conf. 5, pp. 271-278, XP000896094.

(Continued)

*Primary Examiner*—Hanh Phan
(74) *Attorney, Agent, or Firm*—Leonard A. Alkov (57) ABSTRACT

An interrogator identifies an interrogated object using a light transceiver and a dynamic optical tag associated with the interrogated object. The dynamic optical tag receives an output light beam from the light transceiver and controllably reflects the light beam back to the light transceiver as an input light beam. The dynamic optical tag includes a controllable light reflector that is controllable between a reflective state and a non-reflective state and having a modulation signal input, and a controller that provides the modulation signal input to the controllable light reflector. In operation, the interrogator transmits an interrogation light beam from the light transceiver to the dynamic optical tag, the dynamic optical tag reflects a modulated interrogation light beam back to the light transceiver as the input light beam, and the light transceiver receives and analyzes the input light beam to determine an identity of the dynamic optical tag and the interrogated object. A field-of-regard broadening structure such as a volume hologram preferably overlies the controllable light reflector.

22 Claims, 4 Drawing Sheets

OTHER PUBLICATIONS

Tanner Labs: "Optical Communications" (Online) 1999,—2001 XP002380002,Retrieved from the Internet on May 9, 2006, Also *See*: a. http://www.tanner.com/Labs/research/technologies/moics/optical_comm.htm; b. http://www.tanner.com/Labs/research/technologies/moics/ccr.htm; and c. http://www.tanner.com/Labs/research/technologies/moics/communication_link.htm, 2001.

H. Kogelnik, "Couple-Wave Theory for Thick Hologram Gratings", *Bell Sys. Tech. J.*, pp. 2909-2947 (1969).

* cited by examiner

METHOD FOR IDENTIFYING AN INTERROGATED OBJECT USING A DYNAMIC OPTICAL TAG IDENTIFICATION SYSTEM

This invention relates to a friend-or-foe identification system, and more particularly to a reflective optical system with an identification message.

BACKGROUND OF THE INVENTION

Casualties and damage resulting from "friendly fire" are an increasing concern on the modern military battlefield. That is, if a soldier, vehicle, or installation is misidentified as hostile by the troops on the same side, there may be an attack before the misidentification can be discovered. This problem arises in large part because of the increasing reliance on sensors rather than visual recognition to identify objects, and the rapidity with which an attack may be performed.

Historically, friendly-fire incidents were avoided largely through visual identification of objects by the attacker. Also, because attacks were mounted over a period of time, there was usually an opportunity to correct early identification errors. The reliance on automated sensor technology and the rapid pace of an attack in modern warfare has partially negated these traditional controls. More recently, there has been a reliance on radio communications between different elements of a force to guard against friendly-fire casualties and damage. Radio communication to avoid such situations has many drawbacks, including the opportunity for confusion between the source of a radio message and a physical object, stealth considerations in avoiding disclosure of a location and intentions by both the interrogating party and the interrogated object, and the use of countermeasures by the enemy.

Advanced, technology-intensive techniques such as the use of laser radar are under consideration, but are in many cases impractical for widespread use such as by every friendly soldier on the battlefield due to size and cost considerations. On the other hand, inexpensive, low-technology techniques such as the use of distinctive light-reflective patches or active light reflectors affixed to personnel or equipment may be widely used, but they are less secure in that they may also be easily copied or appropriated by the enemy to mask its activities.

There is a need for a friend-or-foe identification system that is highly reliable and secure and is difficult for an enemy to appropriate or mimic, yet is sufficiently inexpensive, light in weight, and compact to allow its widespread utilization. The present invention fulfills this need, and further provides related advantages.

SUMMARY OF THE INVENTION

The present invention provides a method for an interrogating agent to identify an interrogated object as a friend or foe, and to accomplish communication between the interrogating agent and the interrogated object. There is also provided a dynamic optical tag (DOT) identification system to accomplish the friend-or-foe identification. The present approach is highly reliable and is secure against interception of identification signals. It is also secure against the use of countermeasures to identify the location and intentions of either the interrogator or the interrogated object. The identification requires the use of the proper equipment and codes by both the interrogator and the interrogated object. The present approach is light in weight, compact in size, and relatively inexpensive.

In accordance with the invention, a method for an interrogator to identify an interrogated object comprises the steps of providing a light transceiver to the interrogator, and associating a dynamic optical tag with the interrogated object. The dynamic optical tag receives an output light beam from the light transceiver and controllably reflects the light beam back to the light transceiver as an input light beam. The dynamic optical tag comprises a controllable light reflector that is controllable between a reflective state and a non-reflective state and has a modulation signal input, and a controller that provides the modulation signal input to the controllable light reflector. To accomplish the interrogation, the interrogator transmits an interrogation light beam from the light transceiver to the dynamic optical tag, the dynamic optical tag reflects a modulated interrogation light beam back to the light transceiver as the input light beam, and the light transceiver receives and analyzes the modulated input light beam to determine an identity of the dynamic optical tag and thence the interrogated object.

The light transceiver preferably comprises a laser light source that produces the output light beam, a light receiver that receives the input light beam, and an optical system through which the output light beam and the input light beam are directed.

It is desirable that the controllable light reflector of the dynamic optical tag cover a field of regard of greater than 90 degrees relative to the controllable light reflector. That is, much of the versatility of the dynamic optical tag identification system is based upon the ability of the interrogator to obtain information about the interrogated object over a wide angular field of regard. The field of regard is measured from and relative to the interrogated object. The controllable light reflector of the dynamic optical tag preferably comprises a micro electro-mechanical system (MEMS) corner cube array, at least one of whose reflective surfaces may be controllably moved to a position where the corner cube array reflects incident light or to an alternative position where the corner cube array does not reflect incident light.

The MEMS corner cube array has a field of regard of 90 degrees, but cannot respond to an interrogating field at higher angles. To achieve a wider field of regard, and typically up to as much as about 170 degrees, a field-of-regard broadening structure may be positioned overlying the controllable light reflector. The preferred field-of-regard broadening structure is a volume hologram, although other field-of-regard broadening structures may be used. More preferably, at least two volume holograms are positioned overlying the controllable light reflector. The volume holograms may be positioned in a side-by-side relation or in a superimposed relation. Examples of operable volume holograms include those having a cylindrical optical power, a Fresnel Zone plate pattern, or a linear grating pattern. Alternatively, the corner cube array may be divided into multiple segments, each oriented along a different central axis. This approach is operable, but reduces the light-reflecting efficiency.

The use of the corner cube array provides a retro-reflected signal back to the interrogator. This retro-reflected signal has a high reflecting efficiency, typically with at least two orders of magnitude in signal-to-noise ratio, as compared with a non-retro-reflected signal. The corner cube array therefore can be used for long-range identification.

The interrogated object may additionally be provided with a tag light receiver for receiving the output light beam.

Without the tag light receiver, the dynamic optical tag cannot receive coded information from the interrogator for processing, but instead can only reflect the modulated interrogation beam back to the interrogator so that information is conveyed from the interrogated object to the interrogator. By providing the interrogated object with the tag light receiver, a coded output light beam from the interrogator may be received and processed by the dynamic optical tag to convey information from the interrogator to the dynamic optical tag.

A dynamic optical tag identification system comprises a light transceiver, and a dynamic optical tag that receives an output light beam from the light transceiver and controllably reflects the light beam back to the light transceiver as an input light beam. The dynamic optical tag comprises a controllable light reflector that is controllable between a reflective state and a non-reflective state and has a modulation signal input. The controllable light reflector desirably reflects over a field of regard of greater than 90 degrees relative to the controllable light reflector. A controller provides the modulation signal input to the controllable light reflector. Other compatible features discussed herein may be used with the dynamic optical tag.

The dynamic optical tag identification system allows the interrogator to selectively interrogate the dynamic optical tag of an interrogated object. Neither the interrogator nor the interrogated object reveals its position or identity, other than to the other party to the line-of-sight identification transaction. The dynamic optical tag does not just reflect light back to the interrogator. Instead, it sends back a modulated (i.e., coded) message that must be properly read before the interrogator recognizes the interrogated object as friendly. That is, simply positioning a mirror or a dynamic optical tag without the proper code to reflect the light beam sent by the light transceiver will not be recognized as a friendly response by the light transceiver. The nature of the coded message may be changed as needed, so that, for example, a specific code (i.e., a password) associated with a specific date, operation, or the like may be used. The use of the coded message foils attempts by an enemy to capture dynamic optical tags from one operation and use them to immunize its own forces from attack in subsequent operations. The dynamic optical tag operates independently of the interrogated object, so that it may be used for soldiers and for inert objects as well. However, it may be set to notify the soldier or object if it is interrogated.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
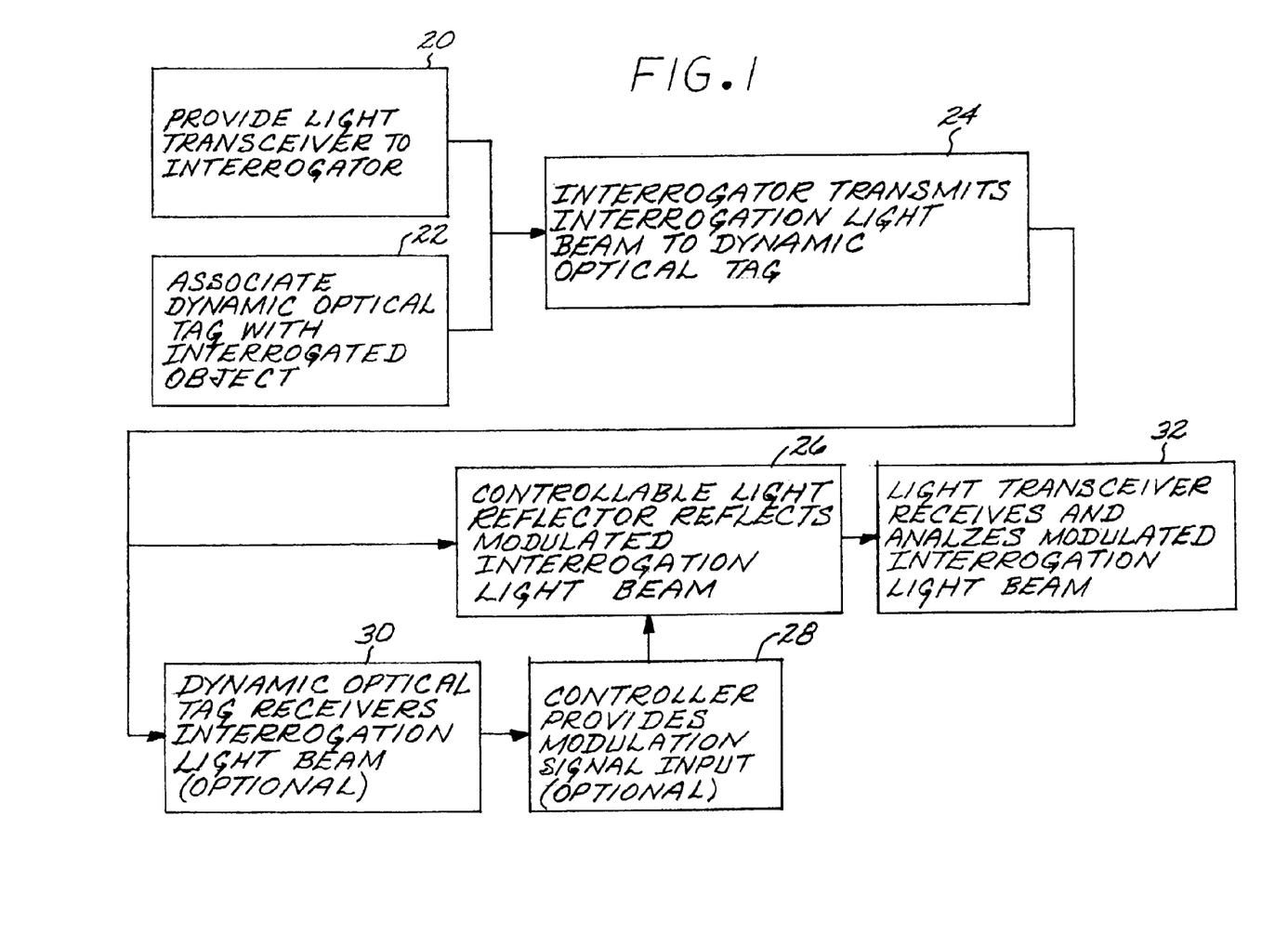
FIG. 1 is a block flow diagram of an embodiment of a method for practicing the present approach.
Figure 2:
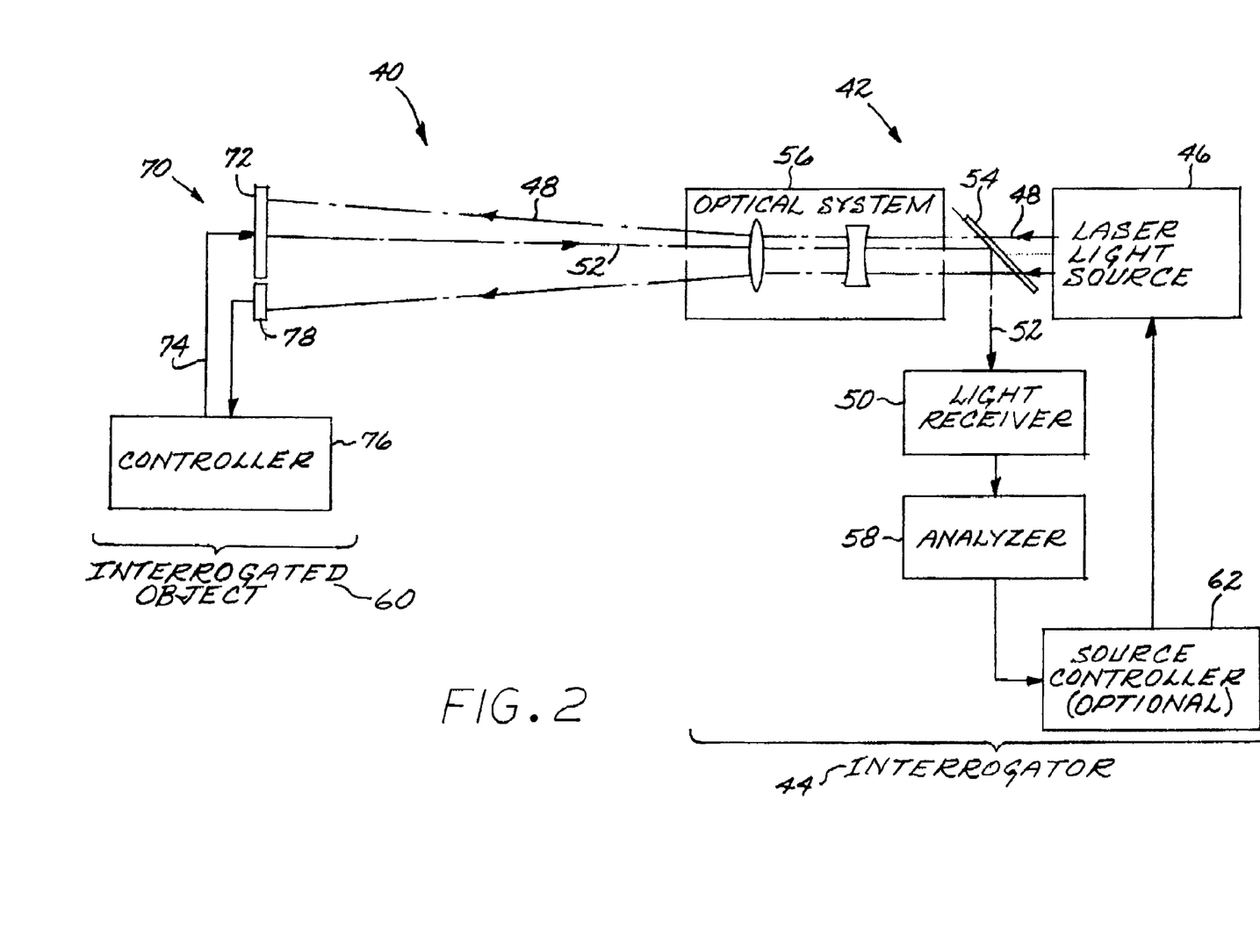
FIG. 2 is a schematic diagram of a dynamic optical tag identification system.

FIG. 1 depicts a method for an interrogator to identify an interrogated object. FIG. 2 depicts a preferred dynamic optical tag system 40 that is used in this identification method. The method includes providing a light transceiver 42 to the interrogator 44, step 20. The light transceiver 42 includes a light source, preferably a laser light source 46, that produces an output light beam 48. The light source may operate at any operable wavelength, but preferably operates in the infrared so that the output light beam 48 is not visible to the unaided human eye. There is additionally in the light transceiver 42 a light receiver 50 that receives an input light beam 52. In the illustrated embodiment, the input light beam 52 is collinear with the output light beam 48 over a portion of its path length, and then is directed to the light receiver 50 by a beam splitter 54. The collinear output light beam 48 and input light beam 52 are directed through an optical system 56. The optical system 56 is used in the manner of a sight, to aim the light transceiver 42 toward potential objects for interrogation and to direct the output light beam 48 to such potential objects, and to receive the input light beam 52 back from interrogated objects 60 in a line-of-sight manner. The light receiver 50 provides a signal responsive to the input light beam 52 to an analyzer 58, which is typically a computer that analyzes the input light beam 52 of the interrogated object 60. In some embodiments, the output light beam 48 produced by the laser light source 46 is modulated, and an optional source controller 62 provides the modulation signal for the output light beam 48 to the laser light source 46.

A dynamic optical tag 70 is physically associated with the interrogated object 60, step 22. The "association" may be accomplished by the interrogated object 60 having the dynamic optical tag 70 temporarily or permanently applied directly thereto, by the interrogated object 60 wearing the dynamic optical tag 70, by the interrogated object 60 carrying the dynamic optical tag 70, or by any other operable approach whereby there is a direct physical association between the interrogated object 60 and the dynamic optical tag 70 so that an identification of the dynamic optical tag 70 may be reliably concluded to be an identification of the interrogated object 60.

The dynamic optical tag 70 receives the output light beam 48 from the light transceiver 42 and controllably reflects the light beam back to the light transceiver 42 as the input light beam 52. The dynamic optical tag 70 has a controllable light reflector 72 that is controllable between a reflective state and a non-reflective state. The controllable light reflector 72 has a modulation signal input 74 from a controller 76 that generates the modulation signal input 74.

Optionally but preferably, the interrogated object 60 is also provided with a tag light receiver 78 of the output light beam. The output of the tag light receiver 78 is provided to the controller 76. The tag light receiver 78 may be used to provide an initial "wakeup" signal, upon first receipt of the output light beam 48, to the controller 76 and to the controllable light reflector 72. The tag light receiver 78 may also or instead be used to received modulated (encoded) information on the output light beam 48, if the laser light source 46 is modulated, to be provided to the controller 76.

The "receiver" such as the tag light receiver 78 is distinct from the "reflector" such as the controllable light reflector 72, as the controllable light reflector 72 only serves as a reflector, and does not detect the output light beam 48 for signal processing. The tag light receiver 78 at the interrogated object 60 is also distinct from the light receiver 50 on the interrogator 44.

Figure 3:
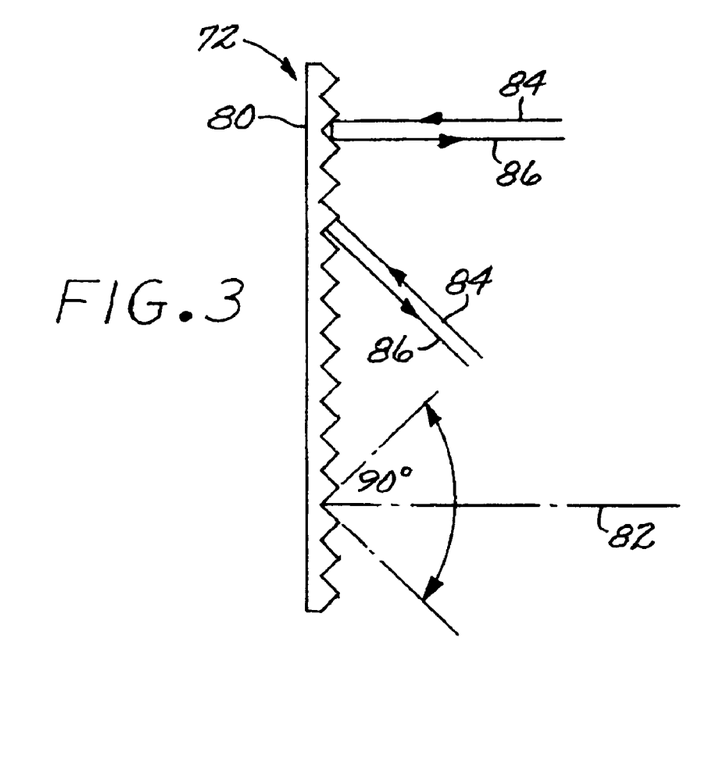
FIG. 3 is a schematic elevational view of a first embodiment of a micro electro-mechanical system corner cube array.
Figure 4:
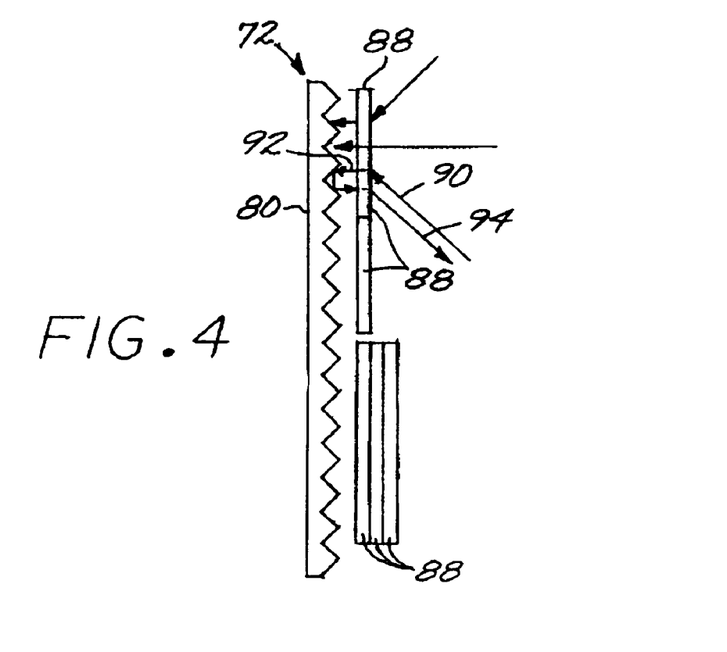
FIG. 4 is a schematic elevational view of a second embodiment of the micro electro-mechanical system corner cube array.

The controllable light reflector 72 may be of any operable type, but is preferably a micro electro-mechanical system (MEMS) corner cube array 80, shown in two-dimensional section in FIGS. 3-4, also sometimes known as a "magic mirror". The corner cube array has three reflecting facets at 90 degrees to each other. In the MEMS corner cube array 80, at least one of the facets is movable, so that the MEMS corner cube array 80 may be controllably switched from a reflecting state to a non-reflecting state at a rate on the order of 100 KHz for currently available MEMS corner cube arrays. The switching is accomplished by moving at least one of the facets of the corner cube array 80 away from its reflecting orientation of 90 degrees to the other facets. The MEMS corner cube array 80 typically may be manufactured with a thickness of from about 20 micrometers to about 1 millimeter, and the array 80 therefore is quite thin and plate-like. When it is set to reflect light, the MEMS corner cube array 80 reflects light over a conical field of regard of a half-angle of 45 degrees about a normal axis 82, or 90 degrees total. That is, an incident light beam 84 that is at 45 degrees or less to the normal axis 82 is retro-reflected back as a reflected light beam 86 along the same path with near total efficiency. When it is set to not reflect light, there is little if any reflection from its surface. The corner cube array is known in the optics art for other applications. The MEMS corner cube array is also known in the art for other applications, see for example U.S. Pat. No. 6,137,623 and U.S. Pat. No. 6,359,719, whose disclosures are incorporated by reference. Other operable controllable light reflectors such as AO (acoustic-optical) modulators may also be used.

Figure 5:
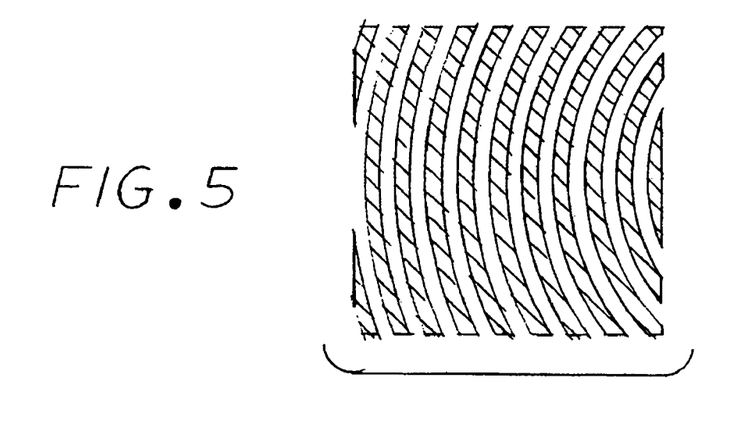
FIG. 5 is a schematic plan view of a volume hologram with a cylindrical power.
Figure 6:
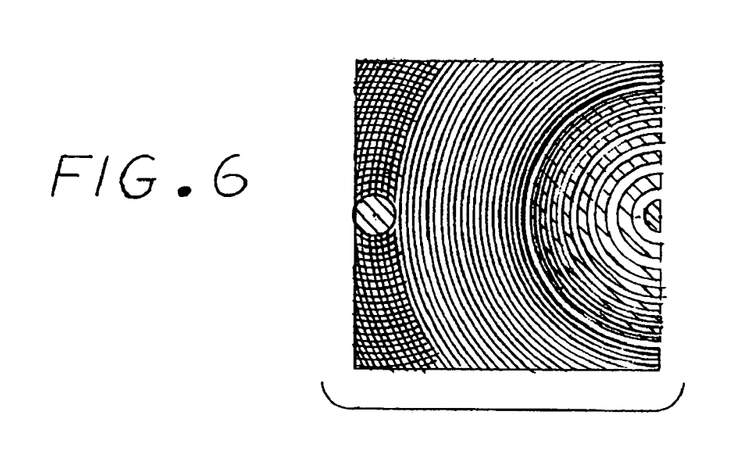
FIG. 6 is a schematic plan view of a volume hologram with a Fresnel zone plate pattern.
Figure 7:
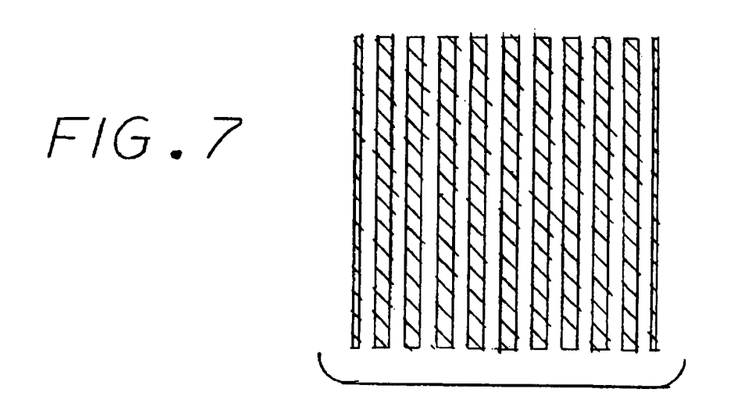
FIG. 7 is a schematic plan view of a volume hologram with a linear grating pattern.

It is highly desirable that the field of regard for the controllable light reflector 72 be greater than 45 degrees half angle, or 90 degrees total, so that there is a reflected light beam back to the light transceiver 42 at even higher angles relative to the normal axis 82. To achieve this greater field of regard, a field-of-regard broadening structure may be positioned overlying the controllable light reflector 72. In the preferred embodiment of this approach, a volume hologram 88 is positioned overlying the controllable light reflector 72, as shown in FIG. 4. The volume hologram 88 bends light rays toward the normal from the incident angle and back to the source along the same angle as the incident angle, as indicated by entry ray path 90, interior ray path 92, and exit ray path 94 in FIG. 4. See the discussion in H. Kogelnik. "Couple-Wave Theory for Thick Hologram Gratings", *Bell Sys. Tech. J.*, page 2909-2947 (1969). Even more preferably, at least two volume holograms 88 are positioned overlying the controllable light reflector 72, also as shown in FIG. 4. The volume holograms 88 may be positioned in a side-by-side relation, or in a superimposed, overlying relation, both of which are illustrated in FIG. 4. ("Side-by-side" means that a single light ray does not pass through the volume holograms in the side-by-side relation. "Superimposed" means that a single light ray does pass through all of the volume holograms that are in the superimposed relation.) When there is incident light in the sensitivity range of the volume hologram 88, it is bent toward the normal direction. When there is no incident light in the sensitivity range of the volume hologram, it acts as a fully transparent window so that other overlying or underlying volume holograms 88 may come into play. By using a set of side-by-side or superimposed volume holograms 88, the field of regard maybe extended to nearly 180 degrees (90 degrees half angle), but is typically limited to a maximum of about 160 degrees (80 degrees half angle) for practical applications. That is, if the light transceiver 42 is anywhere within 80 degrees of the normal axis 82 of the controllable light reflector 72, its output light beam 48 is reflected back as the input light beam 52 under the proper modulation conditions. FIGS. 5-7 illustrate some examples of volume holograms 88 having a cylindrical optical power (FIG. 5), a Fresnel Zone plate pattern (FIG. 6), and a linear grating pattern (FIG. 7), respectively. Other field-of-regard broadening structures may be used instead of the volume hologram. For example, other types of holograms may be used, but with a reduced light-collecting efficiency. Other field-of-regard broadening optical devices such as a lens system, an example being a fisheye lens, could be used, but are not practical for most applications because of their bulk.

Returning to the block flow diagram of FIG. 1, the interrogator 44 transmits an interrogation light beam in the form of the output light beam 48 from the light transceiver 42 to the dynamic optical tag 70, step 24. The dynamic optical tag 70 reflects a modulated interrogation light beam back to the light transceiver as the input light beam 52, step 26. The modulation of the reflected input light beam 52 is achieved by the controller 76 modulating the controllable facet(s) of the MEMS corner cube array 80 to switch the MEMS corner cube array 80 between its reflecting and nonreflecting states, producing a binary modulation that may be coded with information. Specifically, coded information is used to identify a friendly interrogated object 60. The light transceiver 42 receives and its analyzer 58 analyzes the input light beam 52 to determine whether the input light beam 52 has the proper modulation, and thence the friend-or-foe identity of the dynamic optical tag 70 and of the interrogated object 60, step 32. Additional information may also be transmitted to the interrogator 44 as well, if modulated into the input light beam 52 by the dynamic optical tag 70.

Additionally, the source controller 62 may modulate the laser light source 46 so that the output light beam 48 is modulated. The modulated light output beam 48 may transmit information to the tag light receiver 78 and thence to the interrogated object 60, step 30. In this manner, information is provided from the interrogator 44 to the interrogated object 60. The controller 76 may control the modulation signal input 74 responsively, step 28. The two-way communication of information between the interrogator 44 and the interrogated object 60 is preferably performed in a time-division manner, with the basic reflection identification performed in a first allocated time slice, and active communication of information from the interrogated object 60 back to the interrogator 44 performed in a second allocated time slice.

The present approach thereby allows several types of line-of-sight communication between the interrogator 44 and the interrogated object 60. The communication may be limited to friend-or-foe identification. The communication may include one-way communication from the interrogator 44 to the interrogated object 60, or it may include two-way line-of-sight communication between the interrogator 44 and the interrogated object 60. In all cases, only the interrogator 44 need have a light source 46—the interrogated object 60 need not carry its own light source. Thus, for example, a commander may obtain both friend-or-foe information and readout information such as tactical information or medical/mechanical status from the interrogated object 60 such as a soldier or a vehicle, without the soldier or vehicle crew being distracted from the mission and without giving away its position or intentions. The commander may also send instructions to the interrogated object 60 without giving away position or intentions.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for an interrogator to identify an interrogated object, comprising the steps of
  providing an infrared light transceiver to the interrogator;
  associating a dynamic optical tag with the interrogated object, wherein the dynamic optical tag receives an infrared output light beam from the light transceiver and controllably reflects the output light beam back to the light transceiver as an input light beam, wherein the dynamic optical tag comprises
    a controllable light reflector that is controllable between a reflective state and a non-reflective state and has a modulation signal input, wherein the controllable light reflector includes a field-of-regard broadening structure overlying the controllable light reflector; wherein the field-of-regard broadening structure is operable in infrared wavelengths to provide a field of regard of the output light beam of greater than 90 degrees relative to the controllable light reflector; and
    a controller that provides the modulation signal input to the controllable light reflector;
  the interrogator transmitting an interrogation light beam from the light transceiver to the dynamic optical tag as the output light beam;
  the dynamic optical tag reflecting a modulated interrogation light beam back to the light transceiver as the input light beam; and
  the light transceiver receiving and analyzing the input light beam to determine an identity of the dynamic optical tag and the interrogated object.

2. The method of claim 1, including an additional step of providing the interrogated object with a tag light receiver of the output light beam.

3. The method of claim 1, wherein the step of associating includes the step of
  providing the controllable light reflector comprising a micro electro-mechanical system corner cube array.

4. The method of claim 1, wherein the step of associating includes the step of
  positioning a volume hologram overlying the controllable light reflector as the field-of-regard broadening structure.

5. The method of claim 1, wherein the step of associating includes the step of
  positioning at least two volume holograms overlying the controllable light reflector as the field-of-regard broadening structure.

6. The method of claim 1, wherein the step of associating includes the step of
  positioning at least two volume holograms overlying the controllable light reflector as the field-of-regard broadening structure, wherein the at least two volume holograms are in a side-by-side relation.

7. The method of claim 1, wherein the step of associating includes the step of positioning at least two volume holograms overlying the controllable light reflector as the field-of-regard broadening structure, wherein the at least two volume holograms are in a superimposed relation.

8. The method of claim 1, wherein the step of associating includes the step of
  positioning a volume hologram overlying the controllable light reflector as the field-of-regard broadening structure, wherein the volume hologram has a cylindrical optical power, a Fresnel Zone plate pattern, or a linear grating pattern.

9. A dynamic optical tag identification system comprising
  a light transceiver; and
  a dynamic optical tag that receives an output light beam from the light transceiver and controllably reflects the light beam back to the light transceiver as an input light beam, wherein the dynamic optical tag comprises
    a controllable light reflector that is controllable between a reflective state and a non-reflective state and having a modulation signal input, wherein the controllable light reflector reflects over a field of regard of greater than 90 degrees relative to the controllable light reflector, and
    a controller that provides the modulation signal input to the controllable light reflector.

10. The dynamic optical tag identification system of claim 9, wherein the light transceiver comprises
  a laser light source that produces the output light beam,
  a light receiver tat receives the input light beam, and
  an optical system through which the output light beam and the input light beam are directed.

11. The dynamic optical tag identification system of claim 9, wherein the controllable light reflector comprises
  a micro electro-mechanical system corner cube array.

12. The dynamic optical tag identification system of claim 9, wherein the dynamic optical tag further includes
  a tag light receiver operable to receive the output light beam.

13. The dynamic optical tag identification system of claim 9, wherein the controllable light reflector comprises
  a light reflecting structure, and
  a field-of-regard broadening structure overlying the light-reflecting structure.

14. The dynamic optical tag identification system of claim 9, wherein the controllable light reflector comprises
  a light reflecting structure, and
  a volume hologram overlying the light-reflecting structure.

15. The dynamic optical tag identification system of claim 9, wherein the controllable light reflector comprises
  a light reflecting structure, and
  a volume hologram overlying the light-reflecting structure, wherein the volume hologram has a cylindrical optical power.

16. The dynamic optical tag identification system of claim 9, wherein the controllable light reflector comprises
  a light reflecting structure, and
  a volume hologram overlying the light-reflecting structure, wherein the volume hologram has a Fresnel Zone plate pattern.

17. The dynamic optical tag identification system of claim 9, wherein the controllable light reflector comprises
  a light reflecting structure, and
  a volume hologram overlying the light-reflecting structure, wherein the volume hologram has a linear grating pattern.

18. The dynamic optical tag identification system of claim 9, wherein the controllable light reflector comprises
 a light reflecting structure, and
 at least two volume holograms overlying the light-reflecting structure.

19. The dynamic optical tag identification system of claim 9, wherein the controllable light reflector comprises
 a light reflecting structure, and
 at least two volume holograms overlying the light-reflecting structure, wherein the at least two volume holograms are in a side-by-side relation.

20. The dynamic optical tag identification system of claim 9, wherein the controllable light reflector comprises
 a light reflecting structure, and
 at least two volume holograms overlying the light-reflecting structure, wherein the at least two volume holograms are in a superimposed relation.

21. The dynamic optical tag identification system of claim 9, wherein. the controller has a capability to modulate the reflected beam with information comprising tactical or status information.

22. A dynamic optical tag identification system comprising
 a light transceiver operating in an infrared wavelength; and
 a dynamic optical tag that receives an infrared output light beam from the light transceiver and controllably reflects the light beam back to the light transceiver as an input light beam, wherein the dynamic optical tag comprises
  a controllable light reflector that is controllable between a reflective state and a non-reflective sate and having a modulation signal input, wherein the controllable light reflector reflects the infrared output light beam over a field of regard of greater than 90 degrees relative to the controllable light reflector, and
 a controller that provides the modulation signal input to the controllable light reflector.

* * * * *